United States Patent [19]

Akamatsu et al.

[11] Patent Number: 4,976,140
[45] Date of Patent: Dec. 11, 1990

[54] INTAKE AIR FLOW RATE MEASURING APPARATUS FOR USE IN INTERNAL COMBUSTION ENGINE

[75] Inventors: Masuo Akamatsu, Katsuta; Masayoshi Suzuki, Ohta, both of Japan

[73] Assignee: Hitachi, Ltd., Tokyo, Japan

[21] Appl. No.: 426,059

[22] Filed: Oct. 24, 1989

[30] Foreign Application Priority Data

Nov. 2, 1988 [JP] Japan ................. 63-276285

[51] Int. Cl.$^5$ .............................................. G01F 1/68
[52] U.S. Cl. ................................. 73/118.2; 73/204.19
[58] Field of Search ............. 73/118.2, 204.15, 204.18, 73/204.19; 123/494

[56] References Cited

U.S. PATENT DOCUMENTS

| | | | |
|---|---|---|---|
| 4,196,622 | 4/1980 | Peter | 73/118.2 |
| 4,297,881 | 11/1981 | Sasayama et al. | 73/204 |
| 4,400,974 | 8/1983 | Nishimura et al. | 73/118.2 |
| 4,838,078 | 6/1989 | Tsutsumi | 73/118.2 |

FOREIGN PATENT DOCUMENTS 182524 7/1988 Japan .................. 73/118.2

*Primary Examiner*—Jerry W. Myracle
*Attorney, Agent, or Firm*—Antonelli, Terry, Stout & Kraus

[57] ABSTRACT

In a drive processing circuit comprising a flow velocity measuring resistor and a temperature compensating resistor of a hot wire type air flow meter, a resistor is inserted between a connecting point of two resistors and an inverting input terminal of an operational amplifier. A condenser is inserted between an inverting input terminal of the amplifier and the non-inverting input terminal of the amplifier. A resistant value of the inserted resistor is set larger than a resistant value of the temperature compensating resistor. A low pass filter comprises the inserted resistor and the inserted condenser. The high frequency noises, which intrude through the temperature compensating resistor, are cut-off by the low pass filter.

12 Claims, 2 Drawing Sheets

INTAKE AIR FLOW RATE MEASURING APPARATUS FOR USE IN INTERNAL COMBUSTION ENGINE

BACKGROUND OF THE INVENTION

The present invention relates to an intake air flow rate measuring apparatus for use in an internal combustion engine and, more particularly to an intake air flow rate measuring apparatus for use in an internal combustion engine for an automobile. The intake air flow rate measuring apparatus measures an intake air flow rate necessary for an execution of a fuel supply amount which is supplied into an automotive internal combustion engine.

The present invention relates to an intake air flow rate measuring apparatus for use in an internal combustion engine such as a hot wire type air flow meter or a hot film type air flow meter for measuring an air flow rate by utilizing a cooling action of an air flow on a heat generating temperature dependent resistor disposed in an air flow passage. The hot wire type air flow meter or the hot film type air flow meter according to the present invention is suitably applicable to the measurement of an intake air flow rate of an automotive internal combustion engine.

As a conventional intake air flow rate measuring apparatus for use in an internal combustion engine, there has been known a technique that an intake air flow rate measuring apparatus such as a hot wire type air flow meter has a drive processing circuit for heating a heat generating temperature dependent resistor and for processing various electric signals, for example, as disclosed in U.S. Pat. No. 4,400,974.

The conventional hot wire type air flow meter adopts a constant temperature type control circuit utilizing an operational amplifier as the drive processing circuit. The constant temperature type control circuit in the hot wire type air flow meter carries out a constant temperature control for the heat generating temperature dependent resistor.

The constant temperature type control circuit constituting the drive processing circuit in the conventional hot wire type air flow meter has a following circuit structure. Namely, voltage is applied to a series resistor, which comprises a heat generating temperature dependent resistor and a current detecting resistor, and further the voltage, which is applied to the above stated series resistor, is adjusted by making as an input therefor with a partial voltage output by the series resistor.

Besides, in an automotive internal combustion engine, the high frequency noises occur very often by the ignition spark and the discharge accompanying the electric supply to a distributor, and the radiation from the mobile ham transceiver is more serious. Concretely, in the conventional hot wire type air flow meter, since both a flow velocity measuring resistor constituting a heat generating temperature dependent resistor and a temperature compensating resistor constituting a temperature dependent resistor are exposed in an air flow passage, there is a phenomenon that high frequency noises intrude through an exposed portion, in which both resistors are exposed in the air flow passage, in the hot wire type air flow meter.

Therefore, in case that the high frequency noises intrude through the drive processing circuit in the hot wire type air flow meter, since the operational amplifier constituting the drive processing circuit is made an error operation, and the voltage applied to the series resistor is made also an error operation, accordingly an error operation occurs in the drive processing circuit in the conventional hot wire type air flow meter.

As a result, there is short of the reliability on the partial voltage output by the series resistor in the drive processing circuit, which indicates the intake air flow rate, in the conventional hot wire type air flow meter.

SUMMARY OF THE INVENTION

An object of the present invention is to provide an intake air flow rate measuring apparatus for use in an internal combustion engine wherein an intake air flow rate signal in the intake air flow rate measuring apparatus can be outputted accurately.

Another object of the present invention is to provide an intake air flow rate measuring apparatus for use in an internal combustion engine wherein an error operation of an operational amplifier in a drive processing circuit in the intake air flow rate measuring apparatus can be dissolved.

A further object of the present invention is to provide an intake air flow rate measuring apparatus for use in an internal combustion engine wherein an intrusion of high frequency noises through an operational amplifier in a drive processing circuit can be prevented.

A further object of the present invention is to provide an intake air flow rate measuring apparatus for use in an internal combustion engine wherein an intrusion of high frequency noises through a temperature dependent resistor in a drive processing circuit can be cut-off.

A further object of the present invention is to provide an intake air flow rate measuring apparatus for use in an internal combustion engine wherein an intrusion of high frequency noises through a flow velocity measuring resistor in a drive processing circuit can be cut-off.

A further object of the present invention is to provide an intake air flow rate measuring apparatus for use in an internal combustion engine wherein an intrusion of high frequency noises through a temperature compensating resistor in a drive processing circuit can be cut-off.

In accordance with the present invention, an intake air flow rate measuring apparatus for use in an internal combustion engine comprises a flow velocity measuring resistor arranged in an air suction passage for supplying air into an internal combustion engine; a temperature compensating resistor arranged in the air suction passage for supplying air into the internal combustion engine; a first low pass filter means connected electrically to the flow velocity measuring resistor and having an attenuation in regard to a high frequency noise; a second low pass filter means connected electrically to the temperature compensating resistor and having an attenuation in regard to a high frequency noise; an operational amplifier having an inverting input terminal and a non-inverting input terminal being connected to the first low pass filter means and the second low pass filter means, and the operational amplifier compares an output signal from the first low pass filter means and an output signal from the second low pass filter means; and a current control means for controlling current to supply the flow velocity measuring resistor and the temperature compensating resistor in accordance with an output signal of the operational amplifier.

According to the above stated structure of the present invention, the high frequency noises, which intrude through the flow velocity measuring resistor or the temperature compensating resistor in the drive processing circuit in the intake air flow rate measuring apparatus, can be cut-off by the low pass filter means having the attenuation against the high frequency noise, therefore the possibility of an error operation in the operational amplifier of the drive processing circuit can eliminated.

According to the present invention, even when the high frequency noises intrude through the flow velocity measuring resistor or the temperature compensating resistor in the drive processing circuit in the intake air flow rate measuring apparatus, it can be obtained in a practical use a remarkable effect that the intake air flow rate signal in the drive processing circuit can be outputted accurately.

DESCRIPTION OF THE INVENTION

One embodiment of an intake air flow rate measuring apparatus for use in an internal combustion engine according to the present invention will be explained in detail referring to drawings.

Figure 1:
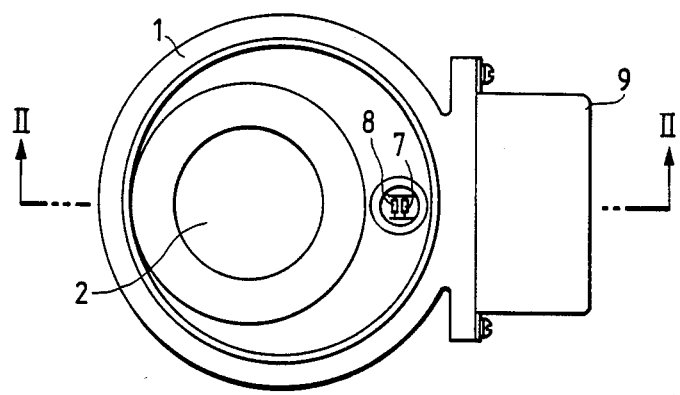
FIG. 1 is a plane view showing one embodiment of an intake air flow rate measuring apparatus for use in an internal combustion engine according to the present invention.
Figure 2:
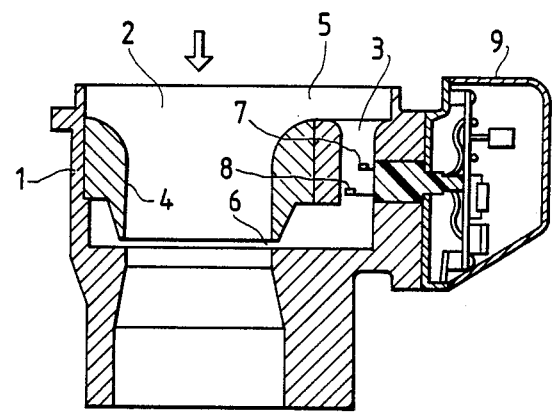
FIG. 2 is a cross-sectional view taking along II—II line in FIG. 1.

A structure of an intake air passage having the intake air flow rate measuring apparatus for use in an internal combustion engine, in this case a hot wire type air flow meter, is shown in FIG. 1 and FIG. 2.

An intake air passage 1 has an air suction passage 2 formed a venturi portion 4 therein, and the intake air passage 1 is connected to a throttle valve chamber at a lower end thereof. A fuel injector is mounted at a downstream of a throttle valve provided on the throttle valve chamber.

Air sucked in an arrow mark direction in FIG. 2 passes through the venturi portion 4, and a part of the air passes through a bypass air passage 3.

Namely, the air entered from an air flow branch portion 5 is sucked due to a negative pressure generated at an air flow confluence portion 6. The air flow branch portion 5 is opened at an upperstream of the venturi portion 4, and the air flow confluence portion 6 is opened at a downstream of the venturi portion 4, respectively.

A flow velocity measuring resistor 7 and a temperature compensating resistor 8 are provided respectively in the bypass air passage 3. Each of the flow velocity measuring resistor 7 and the temperature compensating resistor 8 is respectively a hot wire type temperature dependent resistor. The temperature compensating resistor 8 constitutes as a part of a drive processing circuit in the intake air flow rate measuring apparatus such as a hot wire type air flow meter.

A drive processing circuit module member is installed in a circuit mounting box 9. A drive processing circuit in the hot wire type air flow meter controls so as to heat the flow velocity measuring resistor 7, and further controls various electric signals. One embodiment of the drive processing circuit according to the present invention has a structure stated below.

Figure 3:
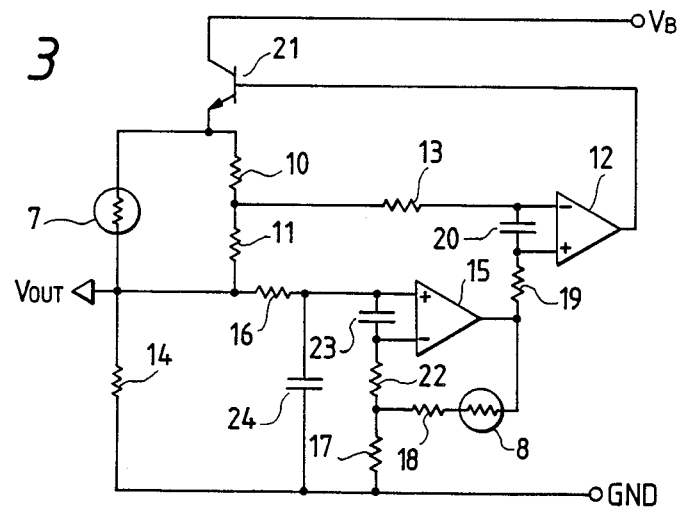
FIG. 3 is a circuit diagram showing a drive processing circuit of one embodiment of an intake air flow rate measuring apparatus for use in an internal combustion engine according to the present invention.

In FIG. 3, a series resistor circuit comprising a resistor 10 and a resistor 11 is connected in parallel to the flow velocity measuring resistor 7. An intermediate connecting point between the resistor 10 and the resistor 11 is connected to an inverting input terminal of an operational amplifier 12 through a resistor 13.

A current detecting resistor 14 is connected in series to the flow velocity measuring resistor 7. An intermediate connecting point between the flow velocity measuring resistor 7 and the current detecting resistor 14 is connected to a non-inverting input terminal of an operational amplifier 15 through a resistor 16.

Further, the current detecting resistor 14 is connected to the ground terminal of the drive processing circuit and the current detecting resistor 14 is connected to a non-inverting input terminal of the operational amplifier 15 through a resistor 16. The inverting input terminal of the operational amplifier 15 is connected to an output terminal of the operational amplifier 15 through a resistor 18 and the temperature compensating resistor 8 via a resistor 22.

The output terminal of the operational amplifier 15 is connected to a non-inverting input terminal of the operational amplifier 12 through a resistor 19. The inverting input terminal of the operational amplifier 12 and the non-inverting input terminal of the operational amplifier 12 are connected each other through a condenser 20.

The output terminal of the operational amplifier 12 is connected to a base of a control transistor 21 in which current from a battery having a voltage ($V_B$) is supplied to each of the respective resistors.

The above stated drive processing circuit structure in the hot wire type air flow meter is a constant temperature type control utilizing the flow velocity measuring resistor 7 and the temperature compensating resistor 8 and carries out for the constant temperature control for the flow velocity measuring resistor 7 and the temperature compensating resistor 8.

The operation of the above stated drive processing circuit in the hot wire type air flow meter is explained, for example, in U.S. Pat. No. 4,297,881.

Next, the present invention has a following circuit constituting members in the drive processing circuit in addition to the above stated drive processing circuit in the conventional hot wire type air flow meter.

Namely, in one embodiment of the present invention shown in FIG. 3, a resistor 22 is inserted between a connecting point of the resistor 17 and the resistor 18 and the inverting input terminal of the operational amplifier 15 in the drive processing circuit. Further, a condenser 23 is inserted between the inverting input terminal of the operational amplifier 15 and the non-inverting input terminal of the operational amplifier 15 in the drive processing circuit.

Herein, a resistant value of the resistor 22 is set larger than a compound resistant value of the resistor 18 and the temperature compensating resistor 8. In case even when the resistor 18 is not provided on the drive processing circuit, the resistant value of the resistor 22 is set larger than the resistant value of the temperature compensating resistor 8 itself.

A resistant value of the flow velocity measuring resistor 7 and the temperature compensating resistor 8 has originally a low resistant value in this embodiment of the present invention. The drive processing circuit having the above stated resistor members fits right with the flow velocity measuring resistor 7 having a low resistant value or the temperature compensating resistor 8 having a low resistance value.

Accordingly, in this embodiment of the present invention, when the temperature compensating resistor 8 has the low resistance value, a low pass filter having the resistor 22 and the condenser 23 is formed in the drive processing circuit.

The low pass filter comprising the resistor 22 and the condenser 23 has a predetermined cut-off frequency, which is determined by the resistor 22 and condenser 23 with a high frequency noise in regard to a normal mode input of the operational amplifier 15.

Further, a condenser 24 is inserted between the non-inverting input terminal of the operational amplifier 15 and the ground. The condenser 24 is connected between an intermediate connecting point of the ground and the resistor 17 and a connecting point between the resistor 16 and the non-inverting input terminal side of the condenser 23.

Herein, in this embodiment of the present invention, the high frequency noises, which flow from the operational amplifier 15 through the flow velocity measuring resistor 7 and from the flow velocity measuring resistor 7 into the operational amplifier 15, are cut-off by the low pass filter comprising the resistance 16 and the condenser 24.

Further, the high frequency noises, which intrude through the temperature compensating resistor 8, are cut-off the normal mode thereof by the low pass filter comprising the resistor 22 and the condenser 23. Also, the high frequency noises, which flow from the operational amplifier 15 through the temperature compensating resistor 8, are cut-off in the common mode thereof by the resistor 16 and the condenser 24.

Further, since the resistor 22 and the condenser 23 have a function so as to delay a negative feed-back input of the operational amplifier 15, it is possible to avoid the problems such as an oscillation in case that when the cut-off frequency, which is determined by the resistor 22 and the condenser 23, is set larger than the cut-off frequency of the operational amplifier 15 and also when the cut-off frequency, which is determined by the resistor 22 and the condenser 23, is set lower than the frequency of the high frequency noise, as shown in this embodiment of the present invention.

According to this embodiment of the present invention, since the high frequency noises, which intrude through the flow velocity measuring resistor 7 and the temperature compensating resistor 8, are cut-off by the respective low pass filter, there is an effect that an intake air flow rate output signal or the partial output voltage ($V_{OUT}$) of the series resistor circuit in the drive processing circuit can be obtained accurately.

Another embodiment of the present invention will be explained referring to drawing.

Figure 4:
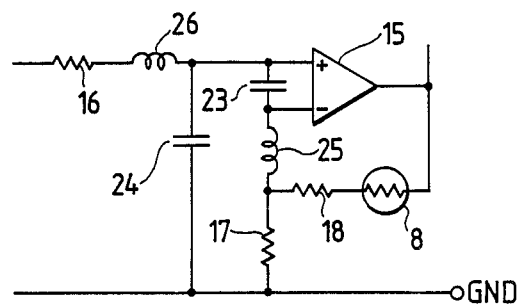
FIG. 4 is an essential part circuit diagram showing a part of a drive processing circuit of another embodiment of an intake air flow rate measuring apparatus for use in an internal combustion engine according to the present invention.

FIG. 4 is a modified embodiment of the present invention in regard to the above stated embodiment shown in FIG. 3. FIG. 4 shows an essential part circuit diagram of the drive processing circuit in the hot wire type air flow meter, in which the respective same reference number indicates the same element shown in FIG. 3.

In the modified embodiment shown in FIG. 4, an inductor 25 such as a coil is inserted between the connecting point of the resistor 17 and the resistor 18 and the inverting input terminal of the operational amplifier 15. The inductor 25 is a replacement body of the resistor 22 shown in FIG. 3.

Further, in the modified embodiment shown in FIG. 4, an inductor 26 such as a coil is inserted between the resistor 16 and the condenser 24.

Accordingly, by the provision of the inductor 25, since the resistant value is heighten only against the high frequency noises, therefore such high frequency noises, which intrude through the temperature compensating resistor 8, can be cut-off similarly to the above stated embodiment shown in FIG. 3.

Also, by the provision of the inductor 26, the high frequency noises, which intrude through the flow velocity measuring resistor 7, can be cut-off similarly to the above stated embodiment shown in FIG. 3. In the modified embodiment of the present invention shown in FIG. 4, the cut-off characteristic can be improved further by the function of the inductor 26.

A further embodiment of the present invention will be explained referring to drawing.

Figure 5:
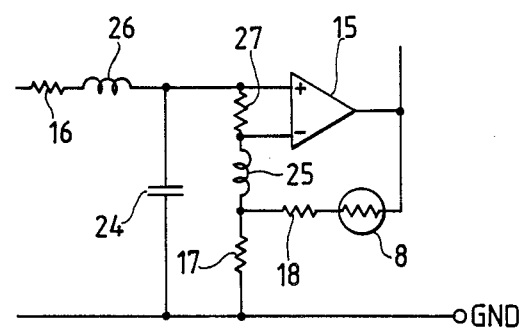
FIG. 5 is an essential part circuit diagram showing a part of a drive processing circuit of a still another embodiment of an intake air flow rate measuring apparatus for use in an internal combustion engine according to the present invention.

FIG. 5 is a further modified embodiment of the present invention in regard to the above stated embodiment shown in FIG. 4. FIG. 5 shows an essential part circuit diagram of the drive processing circuit in the hot wire type air flow meter, in which the respective same reference number indicates the same element shown in FIG. 4.

In the further modified embodiment of the present invention shown in FIG. 5, a resistor 27 is inserted between the inverting input terminal of the operational amplifier 15 and the non-inverting input terminal of the operational amplifier 15. The resistor 27 is a replacement body of the condenser 23 shown in FIG. 4.

Accordingly, by the provision of the resistor 27, the high frequency noises, which intrude through the temperature compensating resistor 8, can be cut-off similarly to the above stated embodiment shown in FIG. 4.

A still further embodiment of the present invention will be explained referring to drawing.

Figure 6:
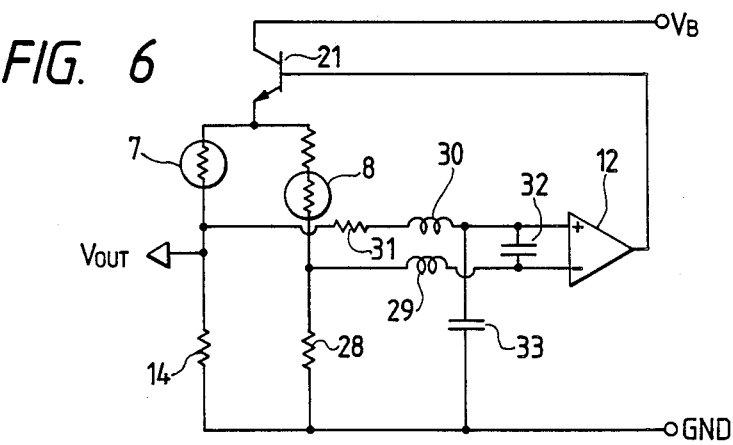
FIG. 6 is a circuit diagram showing a drive processing circuit of another embodiment of an intake air flow rate measuring apparatus for use in an internal combustion engine according to the present invention.

FIG. 6 shows a circuit diagram in which the present invention is adopted to another drive processing circuit in an air flow meter, and in which the respective same reference number indicates the same element shown in FIG. 3.

The drive processing circuit in the air flow meter shown in FIG. 6 has another constant temperature type control circuit in the drive processing circuit in regard to the constant temperature type control circuit shown in FIG. 3.

In FIG. 6, a bridge circuit is formed by the respective resistors which comprises of the flow velocity measuring resistor 7, the temperature compensating resistor 8, the resistor 14, and a resistor 28. An intermediate connecting point of the bridge circuit is connected to the non-inverting input terminal of the operational amplifier 12 and the inverting input terminal of the operational amplifier 12.

An inductor 29 such as a coil is connected to the inverting input terminal of the operational amplifier 12. An inductor 30 and a resistor 31 are connected to the non-inverting input terminal of the operational amplifier 12. A condenser 32 is inserted between the inverting input terminal of the operational amplifier 12 and the non-inverting input terminal of the operational amplifier 12.

Further, a condenser 33 is connected between the connecting point of the resistor 14 and the resistor 28 and the intermediate connecting point of an inductor 30 and the condenser 32.

The detailed operation of this constant temperature type control circuit having the above stated bridge circuit in the drive processing circuit, except for resistor 31, the two inductors 29 and 30, and the condenser 32, of the air flow meter is explained, for example, in U.S. Pat. No. 4,196,622.

In this embodiment of the present invention, at the flow velocity measuring resistor 7 side, a low pass filter is formed by the resistor 31, the inductor 30 and the condenser 33. And at the temperature compensating resistor 8 side, a low pass filter is formed by the inductor 29 and the condenser 32.

Accordingly, the high frequency noises, which intrude into the flow velocity measuring resistor 7, are cut-off by the low pass filter comprising the resistance 31, the inductor 30 and the condenser 33. Also, the high frequency noises, which intrude through the temperature compensating resistor 8, are cut-off by the low pass filter comprising the inductor 29 and the condenser 32.

As stated above, in this embodiment of the present invention, since the high frequency noises, which intrude through the flow velocity measuring resistor 7 and the temperature compensating resistor 8, are cut-off by the respective low pass filter, accordingly there is an effect that the intake air flow rate output signal can be obtained accurately.

As stated above, the present invention is explained by various embodiments, to sum up, the low pass filter is positioned respectively in a front side of each input terminal of the operational amplifier so as to not apply the high frequency noises, which intrude through the flow velocity measuring resistor or the temperature compensating resistor, to each input terminal of the operational amplifier.

The low pass filter structure is explained in every embodiment of the present invention, however the low pass filter is not limited to a filter means shown in one of the above stated embodiment. The low pass filter in the present invention may use to replace mutually a low pass filter comprising different elements or a different structure, and further it is possible to use to combine mutually the low pass filter each other.

I claim:

1. An intake air flow rate measuring apparatus for use in an internal combustion engine comprising:
    a flow velocity measuring resistor arranged in an air suction passage for supplying air in an internal combustion engine;
    a temperature compensating resistor arranged in the air suction passage of the internal combustion engine;
    a first low pass filter connected electrically to said flow velocity measuring resistor and having an attenuation in regard to a high frequency noise;
    a second low pass filter connected electrically to said temperature compensating resistor and having an attenuation in regard to a high frequency noise;
    an operational amplifier having an inverting input terminal and a non-inverting input terminal and being connected to said first low pass filter and said second low pass filter, and said operational amplifier compares an output signal from said first low pass filter and an output signal from said second low pass filter; and
    current control means for controlling current to supply said flow velocity measuring resistor and said temperature compensating resistor in accordance with an output signal of said operational amplifier.

2. An intake air flow rate measuring apparatus for use in an internal combustion engine comprising:
    a flow velocity measuring resistor arranged in an air suction passage for supplying air in an internal combustion engine;
    a temperature compensating resistor arranged in the air suction passage of the internal combustion engine;
    a first low pass filter connected to said flow velocity measuring resistor and having a first resistor and a first condenser;
    an operational amplifier having a first input terminal and a second input terminal, said first input terminal of said operational amplifier being connected to an intermediate point of said first resistor and said first condenser of said first low pass filter;
    a second low pass filter comprising a second resistor and a second condenser, said second resistor of said second low pass filter being connected to said temperature compensating resistor, said second condenser of said second low pass filter being connected to said first input terminal of said operational amplifier, and an intermediate point of said second condenser and said second resistor of said second low pass filter being connected to said second input terminal of said operational amplifier; and
    current control means for controlling current to supply said flow velocity measuring resistor and said temperature compensating resistor in accordance with an output signal of said operational amplifier.

3. An intake air flow rate measuring apparatus for use in an internal combustion engine comprising:
    a flow velocity measuring resistor arranged in an air suction passage for supplying air in an internal combustion engine and connected electrically to a drive processing circuit;
    a temperature compensating resistor arranged in the air suction passage of the internal combustion engine and connected electrically to said drive processing circuit;
    an operational amplifier having an inverting input terminal and a non-inverting input terminal;
    a first low pass filter connected electrically to said temperature compensating resistor and having a first resistor and a first condenser, an intermediate point of said first resistor and said first condenser of said first low pass filter is connected to said inverting input terminal of said operational amplifier, said first resistor of said first low pass filter is connected to said temperature compensating resistor, and said first condenser of said first low pass filter is connected to said non-inverting input terminal of said operational amplifier;

a second low pass filter connected electrically to said flow velocity measuring resistor and having a second resistor and a second condenser, an intermediate point of said second condenser and said second resistor of said second low pass filter being connected to said non-inverting input terminal of said operational amplifier; and a current control means for controlling current to supply said flow velocity measuring resistor and said temperature compensating resistor in accordance with an output signal of said operational amplifier.

4. An intake air flow rate measuring apparatus for use in an internal combustion engine comprising:

a flow velocity measuring resistor arranged in an air suction passage for supplying air in an internal combustion engine and connected electrically to a drive processing circuit;

a temperature compensating resistor arranged in the air suction passage of the internal combustion engine and being connected electrically to said drive processing circuit;

a first operational amplifier having an inverting input terminal and a non-inverting input terminal and being connected electrically to said drive processing circuit;

a second operational amplifier having an inverting input terminal and a non-inverting input terminal and being connected electrically to said drive processing circuit;

a series resistor circuit connected in parallel to said flow velocity measuring resistor, and an intermediate connecting point of said series resistor circuit being connected to said non-inverting input terminal of said second operational amplifier;

a current detecting resistor connected in series to said flow velocity measuring resistor, and an intermediate connecting point of said current detecting resistor and said flow velocity measuring resistor being connected to said non-inverting input terminal of said first operational amplifier;

a first low pass filter connected electrically to said temperature compensating resistor and having a first resistor and a first condenser, an intermediate point of said first resistor and said first condenser of said first low pass filter being connected to said inverting input terminal of said first operational amplifier, said first resistor of said first low pass filter being connected to said temperature compensating resistor, and said first condenser of said first low pass filter being connected to said non-inverting input terminal of said first operational amplifier;

a second low pass filter connected electrically to said flow velocity measuring resistor and having a second resistor and a second condenser, and an intermediate point of said second resistor and said second condenser of said second low pass filter being connected to said non-inverting input terminal of said first operational amplifier; and current control means for controlling current to supply said flow velocity measuring resistor and said temperature compensating resistor in accordance with an output signal of said first operational amplifier and an output signal of said second operational amplifier.

5. An intake air flow rate measuring apparatus for use in an internal combustion engine according to claim 4, wherein:

said first low pass filter having said first resistor and said first condenser operates to cut-off a high frequency noise which flows through said temperature compensating resistor; and said second low pass filter having said second resistor and said second condenser operates to cut-off a high frequency noise which flows through said flow velocity measuring resistor.

6. An intake air flow rate measuring apparatus for use in an internal combustion engine comprising:

a flow velocity measuring resistor arranged in an air suction passage for supplying air in an internal combustion engine and being connected electrically to a drive processing circuit;

a temperature compensating resistor arranged in the air suction passage of the internal combustion engine and being connected electrically to said drive processing circuit;

a first operational amplifier having an inverting input terminal and a non-inverting input terminal and being connected electrically to said drive processing circuit;

a second operational amplifier having an inverting input terminal and a non-inverting input terminal and being connected electrically to said drive processing circuit;

a series resistor circuit connected in parallel to said flow velocity measuring resistor, and an intermediate connecting point of said series resistor circuit being connected to said inverting input terminal of said second operational amplifier;

a current detecting resistor connected in series to said flow velocity measuring resistor, and an intermediate connecting point of said current detecting resistor and said flow velocity measuring resistor being connected to said non-inverting input terminal of said first operational amplifier;

a first low pass filter connected electrically to said temperature compensating resistor and having a first inductor and a first condenser, an intermediate point of said first inductor and said first condenser of said first low pass filter being connected to said inverting input terminal of said first operational amplifier, said first inductor of said first low pass filter being connected to said temperature compensating resistor, and said first condenser of said first low pass filter being connected to said non-inverting input terminal of said first operational amplifier;

a second low pass filter connected electrically to said flow velocity measuring resistor and having a second condenser and a second inductor, and an intermediate point of said second condenser and said second inductor of said second low pass filter being connected to said non-inverting input terminal of said first operational amplifier; and current control means for controlling current to supply said flow velocity measuring resistor and said temperature compensating resistor in accordance with an output signal of said first operational amplifier and an output signal of said second operational amplifier.

7. An intake air flow rate measuring apparatus for use in an internal combustion engine according to claim 6, wherein:
said first low pass filter having said first condenser and said first inductor operates to cut-off a high frequency noise which flows through said temperature compensating resistor; and
said second low pass filter having said second condenser and said second inductor operates to cut-off a high frequency noise which flows through said flow velocity measuring resistor.

8. An intake air flow rate measuring apparatus for use in an internal combustion engine comprising:
a flow velocity measuring resistor arranged in an air suction passage for supplying air in an internal combustion engine and connected electrically to a drive processing circuit;
a temperature compensating resistor arranged in the air suction passage of the internal combustion engine and being connected electrically to said drive processing circuit;
a first operational amplifier having an inverting input terminal and a non-inverting input terminal and being connected electrically to said drive processing circuit;
a second operational amplifier having an inverting input terminal and a non-inverting input terminal and being connected electrically to said drive processing circuit;
a series resistor circuit connected in parallel to said flow velocity measuring resistor, and an intermediate connecting point of said series resistor circuit being connected to said inverting input terminal of said second operational amplifier;
a current detecting resistor connected in series to said flow velocity measuring resistor, and an intermediate connecting point of said current detecting resistor and said flow velocity measuring resistor being connected to said non-inverting input terminal of said first operational amplifier;
a first low pass filter connected electrically to said temperature compensating resistor and having a first inductor and a first resistor, an intermediate point of said first inductor and said first resistor of said first low pass filter being connected to said inverting input terminal of said first operational amplifier, said first inductor of said first low pass filter being connected to said temperature compensating resistor, and said first resistor of said first low pass filter being connected to said non-inverting input terminal of said first operational amplifier;
a second low pass filter connected electrically to said flow velocity measuring resistor and having a second condenser and a second inductor, and an intermediate point of said second condenser and said second inductor of said second low pass filter being connected to said non-inverting input terminal of said first operational amplifier; and
current control means for controlling current to supply said flow velocity measuring resistor and said temperature compensating resistor in accordance with an output signal of said first operational amplifier and an output signal of said second operational amplifier.

9. An intake air flow rate measuring apparatus for use in an internal combustion engine according to claim 8, wherein:
said first low pass filter having said first inductor and said first resistor operates to cut-off a high frequency noise which flows through said temperature compensating resistor; and
said second low pass filter having said second condenser and said second inductor operates to cut-off a high frequency noise which flows through said flow velocity measuring resistor.

10. An intake air flow rate measuring apparatus for use in an internal combustion engine comprising:
a flow velocity measuring resistor arranged in an air suction passage for supplying air in an internal combustion engine and being connected electrically to a drive processing circuit;
a temperature compensating resistor arranged in the air suction passage of the internal combustion engine and being connected electrically to said drive processing circuit;
an operational amplifier having an inverting input terminal and a non-inverting input terminal and being connected electrically to said drive processing circuit;
a bridge circuit including said flow velocity measuring resistor and said temperature compensating resistor and connected electrically to said drive processing circuit, and an intermediate connecting point of said bridge circuit being connected between said inverting input terminal and said non-inverting input terminal of said operational amplifier;
a control circuit for controlling energizing current to said bridge circuit by receiving a supply of an output signal of said bridge circuit; and
an additional circuit connected to said control circuit, said additional circuit having a high attenuation for cutting-off a high frequency noise which flows through said flow velocity measuring resistor and said temperature compensating resistor, and said additional circuit being connected between said bridge circuit and said control circuit.

11. An intake air flow rate measuring apparatus for use in an internal combustion engine according to claim 10, wherein:
said additional circuit comprises a first low pass filter and a second low pass filter;
said first low pass filter having a first inductor and a first condenser, said first inductor of said first low pass filter being connected to said non-inverting input terminal of said operational amplifier, and said first condenser of said first low pass filter being connected between said non-inverting input terminal and said inverting input terminal of said operational amplifier; and
said second low pass filter having a second inductor and a second condenser, and said second inductor of said second low pass filter being connected between a connecting point of said bridge circuit and said first condenser of said first low pass filter, and said second condenser and said second inductor of said second low pass filter being connected to said non-inverting input terminal of said operational amplifier.

12. An intake air flow rate measuring apparatus for use in an internal combustion engine according to claim 11, wherein:
said first low pass filter having said first inductor and said first condenser operates to cut-off a high frequency noise which flows through said temperature compensating resistor; and
said second low pass filter having said second inductor and said second condenser operates to cut-off a high frequency noise which flows through said flow velocity measuring resistor.

* * * * *